Figure 3:
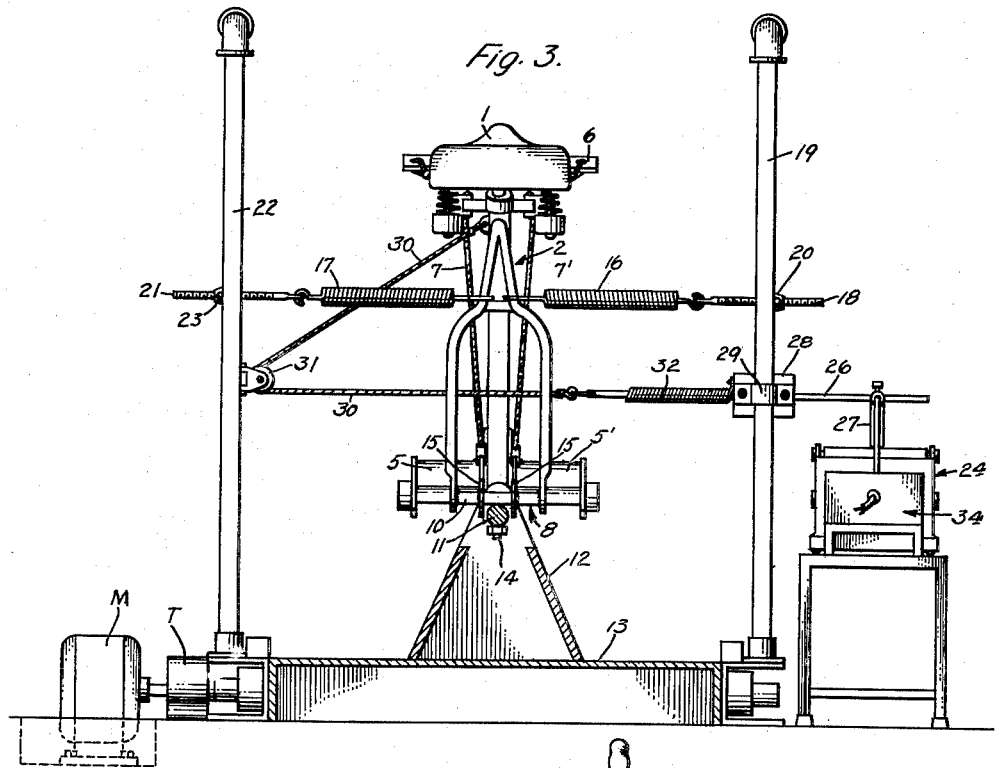

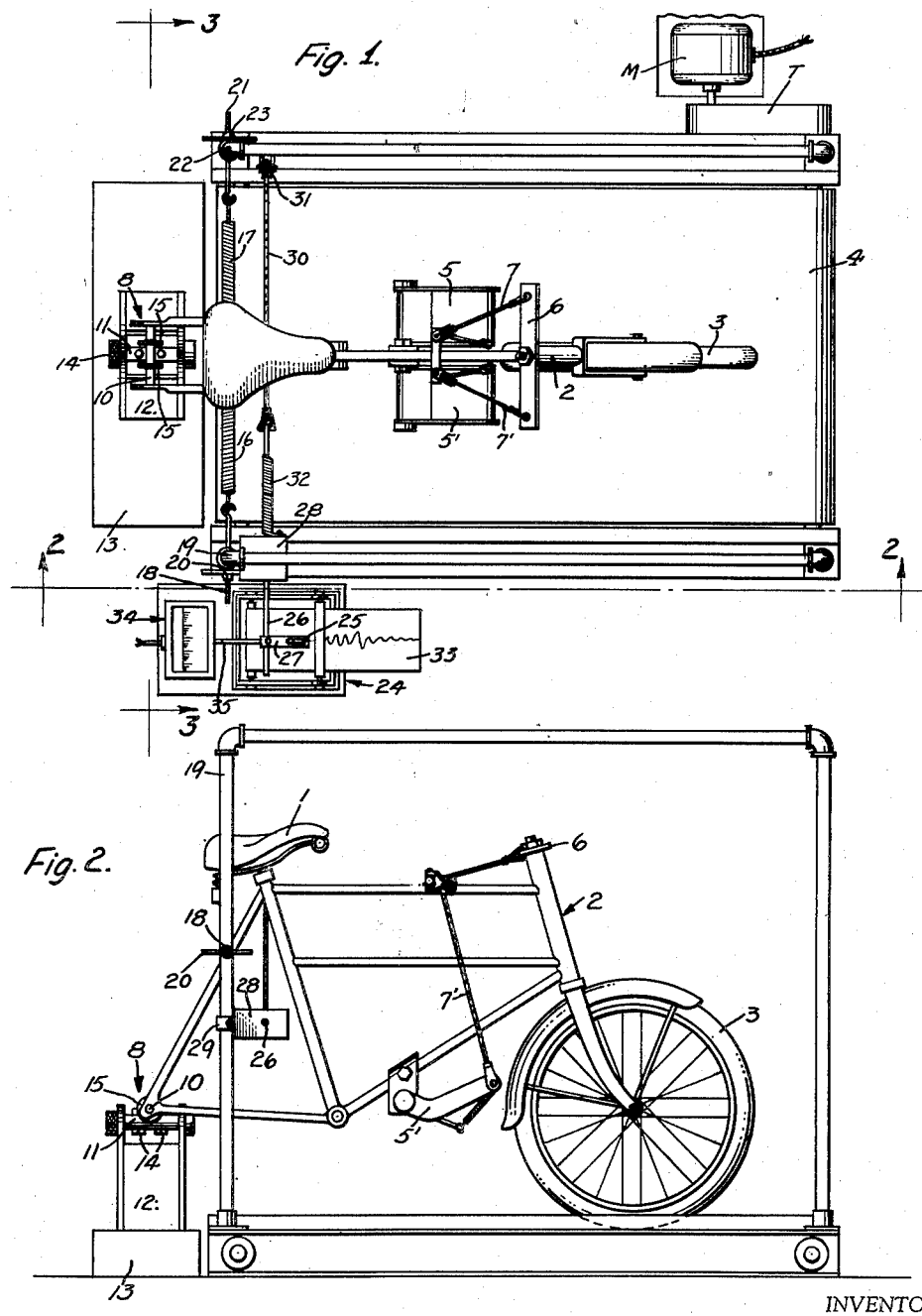

Dec. 30, 1952 — B. A. SHIELDS — 2,623,302
DEVICE FOR TESTING AND TRAINING INDIVIDUALS
IN THE DEVELOPMENT OF MOTOR SKILLS
Filed March 9, 1951 — 3 Sheets-Sheet 2

INVENTOR:
Bert A. Shields,
BY Smith, Michael & Gardiner,
ATTORNEYS

Dec. 30, 1952     B. A. SHIELDS     2,623,302
DEVICE FOR TESTING AND TRAINING INDIVIDUALS
IN THE DEVELOPMENT OF MOTOR SKILLS
Filed March 9, 1951     3 Sheets-Sheet 3
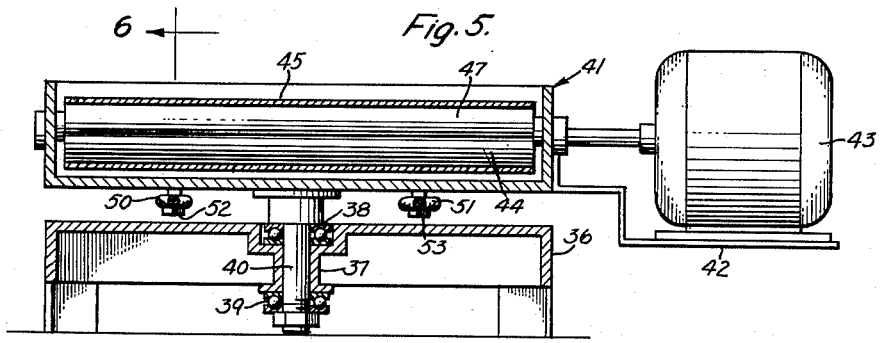
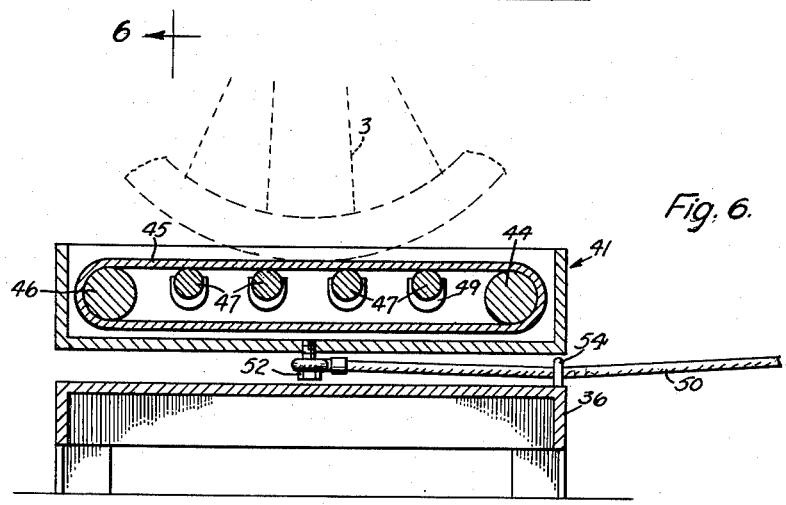
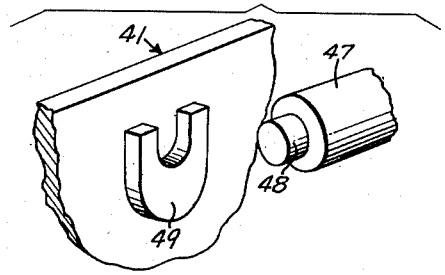
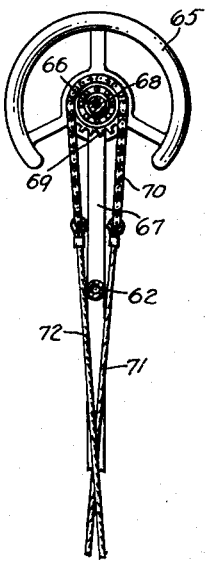
INVENTOR:-
Bert A. Shields,
BY Smith, Michael & Gardiner,
ATTORNEYS.

Patented Dec. 30, 1952

2,623,302

UNITED STATES PATENT OFFICE 2,623,302

DEVICE FOR TESTING AND TRAINING INDIVIDUALS IN THE DEVELOPMENT OF MOTOR SKILLS

Bert A. Shields, Washington, D. C.

Application March 9, 1951, Serial No. 214,700

13 Claims. (Cl. 35—12)

My present invention relates in general to devices for testing and training individuals in the development of motor skills, i. e. those skills which involve controlled muscular movements, and relates particularly to devices for testing the rate of development, and for developing, certain spontaneous reflexes which are essential to, constitute, or contribute to the habit patterns by which a seasoned or experienced pilot maneuvers an aircraft on the ground and in the air.

It is well known to those skilled in the art of flying aircraft that control of an aeroplane about its three independent axes, while the pilot is concentrating on navigation, communications, engine operation, and the like, requires an elaborate system of nerve reflexes which can be developed in an individual only by many hours of persistent practice. By means of the device of my present invention, many of these nerve reflexes so essential to the skillful operation of an aeroplane, can be effectively developed in an individual quickly and without the usual expense and hazards of actual flying and without regard to the weather, darkness, or other detrimental conditions.

It is an object of my present invention to provide a device for testing and training an individual by means of which said individual readily develops the visual and kinesthetic-pedal reflexes by which a seasoned or experienced pilot guides an aeroplane on the ground and by which he maintains an aeroplane in lateral balance during flight, which device includes means whereby its operation for its intended purpose or purposes may be made more difficult or less difficult to thus vary or modify the testing or practice procedure to compensate for variations in the degree of skill of the individual undergoing test or practice.

It is an object of my present invention to provide a device for testing and training an individual by means of which said individual readily develops the visual-brachial reflexes by which a seasoned or experienced pilot exercises attitude and directional control of an aeroplane during flight.

It is an object of my present invention to provide a device for training and developing in an individual effective muscular coordination, by means of which device an individual can readily learn to coordinate the responses of the visual kinesthetic-pedal and visual-brachial reflexes and thereby readily to develop the rhythm and artistry of skillful flying.

It is a further object of my present invention to provide a device of the character above referred to and including means for making a permanent graphic record of the performance of an individual while such individual is using the device as a means for developing certain reflexes related to the art of flying an aeroplane, and, if desired, including an integrator of the electric or electronic type to provide a reading or readings indicative of the ability and aptitude of the individual for mastering the art of flying an aeroplane with reference to, and in comparison with, the ability and aptitude of another individual or group of individuals.

It is a further object of my present invention to provide a device for making a graphic or other record of the performance of an individual while on the device when such individual is under the influence of alcohol, drugs, anoxia, fatigue, or like factors to determine thereby the effect of said or like factors upon the performance of said individual.

It is a still further object of my present invention to provide a device useful in carrying out basic research in the realm of liminal area proprioceptive sensations as demonstrated by spontaneous minimal muscular movements, to contribute thus to the present basic knowledge regarding the ability and aptitude of an individual to make the almost imperceptible muscular movements incident to performing exacting motor skills.

It is a still further object of my present invention to provide a device for testing and training individuals in the development of motor skills, which device is strong and durable, relatively simple and inexpensive to manufacture and assemble, and which is highly efficient in the purpose for which designed.

While the device of my present invention is capable of general use for the accomplishment of the several objects specifically set forth above, the device herein shown and described is particularly adapted for use as a means for carrying out the method of developing and evaluating the rate of development of the spontaneous reflexes in an individual as disclosed and claimed in my co-pending application, Serial No. 206,724, filed January 18, 1951.

Figure 4:
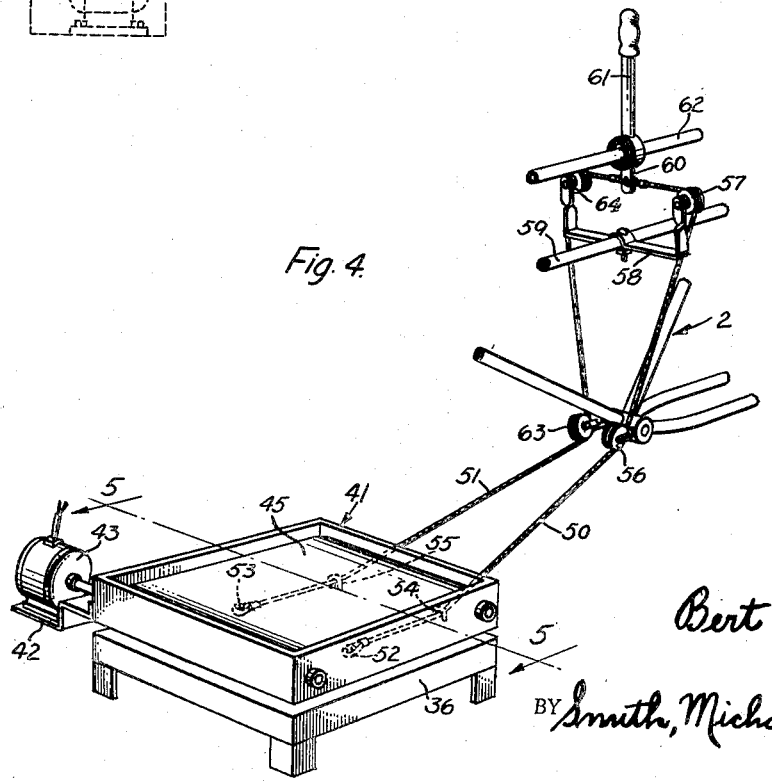

Other objects and advantages of my present invention will be apparent from the following specification when considered with the accompanying drawings submitted for the sole purpose of illustration and not intended to define or limit the scope of the present invention, reference being had for that purpose to the subjoined claims, in which drawings:

Fig. 1 is a plan view of a preferred embodiment of my present invention,

Fig. 2 is a side elevation of that form of my invention shown in Fig. 1 and taken approximately on the line 2—2 of Fig. 1, Fig. 3 is a rear elevation of that form of my invention shown in Figs. 1 and 2 and taken approximately on the line 3—3 of Fig. 1, Fig. 4 is a fragmentary perspective view showing an additional feature of my present invention which may be readily incorporated in the device of Figs. 1 through 3, Fig. 5 is a vertical sectional view of a portion of the structure shown in Fig. 4 and taken approximately on the line 5—5 of Fig. 4, Fig. 6 is a vertical longitudinal sectional view of the structure shown in Fig. 5 and taken approximately on the line 6—6 of Fig. 5, Fig. 7 is an enlarged fragmentary perspective view showing a detail of construction of that form of my invention shown in Figs. 4 through 6, and Fig. 8 is a fragmentary view, partly in section, showing a modified form of control mechanism.

In the accompanying drawings wherein like reference numerals have been employed to designate like parts throughout the several views, I have shown, in Figs. 1 through 3 thereof, one embodiment of my present invention, in which form an adjustable seat 1 of any desired or preferred construction is supported on a main structure 2 which structure, in the example illustrated herein, consists of an ordinary or conventional bicycle frame, it being understood, however, that this main structure may take the form of the cockpit section of an aeroplane, the front seat and dash section of an automobile, or like contrivance. The front wheel 3 of the main structure 2 rests upon, and is supported by, an endless belt 4 of a variable speed treadmill of any preferred or conventional construction driven by a motor M through suitable transmission gearing T, said wheel 3 being controlled directionally by pivotally mounted rudder pedals 5 and 5' connected by flexible cables or the like 7 and 7', respectively, to a steering bar 6 which is rigidly attached to the steering column of wheel 3 in lieu of the conventional handle-bar usually attached to said steering column. Downward pressure on rudder pedal 5, acting through cable 7 and steering bar 6, is effective to turn the wheel 3 toward the left as viewed in Fig. 3 of the accompanying drawings, whereas downward pressure on rudder pedal 5', acting through cable 7' and steering bar 6, is effective to turn the wheel 3 toward the right as viewed in said figure.

The rear end of main structure 2 is supported by a joint arrangement 8 which permits said main structure to tilt laterally from side to side and also to partake of limited movements toward the right and left. One form of relatively simple joint for permitting such movements of the main frame structure, may comprise an axle 10 supported between the spaced leg members of the rear fork of the bicycle-frame-like main structure 2, which axle 10 rests upon, and is supported by, a bar 11 which extends in a direction normal to that of axle 10. Bar 11 is supported at the upper end of a base 12 which extends upwardly from a platform 13 at the rear of the device. As a means for maintaining the relatively normal position of axle 10 with respect to bar 11, I provide a pair of spaced abutments on bar 11, one positioned to the front and one to the rear of the transversely disposed axle 10, these abutments conveniently consisting of spaced bolts 14 which pass through bar 11 and have their heads located on opposite sides of said axle. As a simple and effective means for limiting transverse movements of axle 10 with respect to bar 11, I provide a pair of spaced washers 15, one positioned to the right and one to the left of the bar 11, and being welded or otherwise rigidly secured to said axle.

In order to impart the desired degree of stability to the main structure 2, I provide a pair of stabilizing springs 16 and 17, the inner end of the spring 16 being secured to one side of the main structure, preferably at a point beneath the seat 1 thereon, and the other end of said spring 16 being connected to a threaded rod 18 which passes freely through an upright stanchion 19 and is threadedly engaged by a wing nut 20, rotation of which nut serves to adjust the tension of said spring 16. In like manner, the inner end of spring 17 is secured to the opposite side of the main structure 2, preferably at a point beneath the seat 1 thereon, and the other end of said spring is connected to a threaded rod 21 which passes freely through an upright stanchion 22 and is threadedly engaged by a wing nut 23, rotation of which nut serves to adjust the tension of said spring 17. As will be readily apparent, adjustment of the springs 16 and 17, in the manner just described, permits the main structure 2 to be resiliently maintained in a substantially vertical position between the upright stanchions 19 and 22 when the tension of the two springs 16 and 17 is substantially equal. The degree of force necessary to tilt the main structure 2 about rod 11, i. e. to the right or left, as viewed in Fig. 3 of the accompanying drawings, will, of course, depend upon the degree to which the springs 16 and 17 are tensioned, i. e. if the opposed tension of said springs is relatively light, very little force or unbalance of the main structure will result in tilting of the main structure to the right or left, whereas if the tension of said springs is relatively heavy due to the extension of said springs by the respective threaded rods and wing nuts, considerable force or unbalance of the main structure will be required to effect tilting movements of the main structure 2.

One type of recording means admirably suited for use with the device thus far described consists of a kymograph 24 or like recording instrument of any preferred or desired construction, this device, per se, forming no part of my present invention. The usual pen or scriber 25 of the kymograph 24 is rigidly mounted on a rod 26 by means of an arm 27, the rod 26 passing through a bearing block 28 secured by a clamp 29 to the vertical stanchion 19, the inner end of this rod 26 terminating adjacent one side, i. e. adjacent the right side as viewed in Fig. 3 of the accompanying drawings, of the main structure 2. The inner end of rod 26 is connected to one end of a flexible cable 30 which cable passes through a pulley 31 secured to the vertical stanchion 22 and has its other end secured to the main structure 2 preferably at a point below the seat 1 thereon. In order to keep the cable 30 under continuous tension so that tilting movements of the main structure 2 about the bar 11 toward the right or toward the left as viewed in Fig. 3 of the accompanying drawings will be imparted to the rod 26, arm 27, and pen 25, a tension spring 32 which is stretched, expanded, or tensioned at all times, has its inner end secured to the rod 26 and its outer end secured to the block 28, the arrangement being such that upon tilting of the main structure 2 toward the right (Fig. 3), the cable 30 will pull rod 26 and its attached pen 25 toward the left as viewed in Fig. 3 and further extend spring 32, whereas upon tilting of the main structure toward the left (Fig. 3), the cable 30 slackens and the spring 32 contracts, thereby moving the rod 26 and its attached pen 25 toward the right as viewed in Fig. 3. The aforesaid movements of the rod 26 and of pen 25 secured thereto, cause said pen to inscribe an oscillating or wavy line on the timefed paper or like recording strip 33 of the kymograph 24.

In addition to, or in lieu of, the kymograph 24 just described, I may provide an integrator 34 of the electric or electronic type, such an integrator being a well known device and constituting, per se, no part of my present invention. The integrator 34 has its movable contact arm 35 rigidly secured to the rod 26 to be moved thereby in accordance with the tilting movements of the main structure 2 about the bar 11. Hence, this integrator will effectively indicate the total deviation, per this unit of time, of the main structure 2 from its normal, substantially vertical position.

Referring now to the mechanism illustrated in Figs. 4 through 8 of the accompanying drawings, this mechanism includes means for supporting the steering wheel 3 upon a horizontally-moving surface which surface is manually adjustable about a vertical axis. To this end, I provide a base or platform 36 having at the center of the top surface thereof a suitable vertically disposed bearing sleeve 37 provided with upper and lower antifriction bearings 38 and 39, respectively, for supporting a vertical spindle 40 having its upper end rigidly secured to and supporting, a treadmill frame 41. At one side of frame 41, I position a bracket 42 which supports a variable speed electric motor 43, the main shaft of which passes through a side wall of the frame 41 and drives a roller 44 which, in turn, drives an endless belt 45 of a width corresponding substantially to the width of the treadmill frame 41 and of a length corresponding substantially to the length of said treadmill frame. The belt 45 pases over a roller 46 positioned at the end of the treadmill frame opposite to that at which the roller 44 is mounted, the upper flight of said belt 45 being supported intermediate the rollers 44 and 46 by a plurality of spaced idling rollers 47 whose trunnions 48 are supported in baskets 49 rigidly secured to the opposite side walls of treadmill frame 41. As a means for rotating the treadmill frame 41 about its pivotal mounting on the vertical spindle 40, I provide cables 50 and 51 which have their outer ends attached to bolts 52 and 53, respectively, and pass through guides 54 and 55, respectively. The cable 50 passes through a pulley 56 secured to the lower part of the main structure, and then passes upwardly over a pulley 57 carried by a bracket 58 secured to the horizontal bar 59 of the main structure 2, and has its end rigidly attached to a depending portion 60 of a control stick 61 simulating the control stick of a conventional aeroplane, which control stick 61 is mounted for oscillation about the horizontal bar 62 of the main structure 2. By virtue of this arrangement, it will be obvious that movement of the control stick 61 toward the right as viewed in Fig. 4 of the accompanying drawings, will cause the depending portion 60 of said control stick to move toward the left as viewed in said figure, whereupon the cable 50 will cause the treadmill frame 41 and its associated endless belt 45 to move in a counterclockwise direction about its pivotal mounting, the extent of such movement of said treadmill frame 41 and associated mechanism being dependent upon the extent of movement of control stick 61. In like manner, the cable 51 passes through the pulley 63, also mounted on the lower portion of main structure 2, and then passes upwardly over pulley 64 carried by the bracket 58, and has its end connected to the depending portion 60 of the control stick 61, it being obvious that movement of control stick 61 toward the left as viewed in Fig. 4 of the accompanying drawings, will cause the depending portion 60 of said control stick to move toward the right as viewed in said figure, whereupon the cable 51 will cause the treadmill frame 41 and its associated endless belt 45 to move in a clockwise direction about its pivotal mounting, the extent of such movement of said treadmill frame 41 and associated mechanism being dependent upon the extent of movement of the control stick 61.

In Fig. 8, I have shown a modified form of manually operable means for effecting oscillations of the treadmill frame 41 and its associated endless belt 45 about the vertical spindle 40. In this modified form of the invention, I substitute for the control stick 61 of Fig. 4, a control wheel 65 which is mounted for limited rotation about a stub shaft 66 secured at the upper end of an upright member 67, the lower end of which member is rigidly attached to the horizontal frame member 62 of the main bicycle-like structure 2. The wheel 65 has a hub portion 68 on which is keyed a sprocket wheel 69, the teeth of which sprocket engage a relatively short length of sprocket chain 70, the ends of which chain are attached to cables 71 and 72 which cross each other below the horizontal frame member 62 and pass over pulleys 63 and 56, respectively, and through guides 55 and 54, respectively, and have their ends connected to bolts 53 and 52, respectively. This arrangement is such that rotation of wheel 65 in a clockwise direction as viewed from the rear of the main structure 2 will, through sprocket 69, sprocket chain 70, and cables 71 and 72, cause the treadmill frame 41 and its associated endless belt 45 to turn in a clockwise direction about its pivotal mounting 40, whereas rotation of said wheel 65 in a counterclockwise direction as viewed from the rear of the main structure 2 will cause said treadmill frame 41 and its associated endless belt 45 to turn in a counterclockwise direction about its pivotal mounting 40.

Having thus described the construction of my present invention, I will now explain the preferred manner in which the device may be effectively used to determine the ability and aptitude of an individual for learning or mastering the art of flying an aeroplane. Those who are skilled in this particular art know that the rudder of an aeroplane is employed, during all sorts of flight maneuvers, to keep the aeroplane in proper lateral balance, and that there must be continuous coordination between the rudder controls and aileron controls to prevent the aeroplane from side slipping. It is also well known to those skilled in the art, that the rudder control, in particular, must be operated by the muscular responses that constitute the spontaneous reactions of the kinesthetic-pedal reflexes. As this particular reflex is seldom, if ever, developed by indi- viduals except by those who learn to fly an aeroplane, I have selected this particular reflex as a medium for measuring or otherwise determining an individual's flight capabilities and aptitude. The rate at which an individual can develop this kinesthetic-pedal reflex may be utilized as an indication of the rate at which he will be able to develop those other reflexes that are involved in, are essential to, and constitute a part of, the skill of flying an aeroplane, to provide thus a true measure of, or reliable indication of, his flight capabilities and aptitude.

The flight aptitude test which may be made by the use of my present invention, may be of any desired duration, experience having indicated, however, that a test period of from six to eight minutes is usually sufficient to secure reliable aptitude data. Tests of longer duration may be resorted to where circumstances indicate that longer test periods are necessary or desirable. The test of an individual may conveniently consist of an initial three-minute trial or practice period, during which the individual undergoing test is afforded an opportunity to familiarize himself with the pedal steering arrangement for wheel 3 and to otherwise get the "feel" of the device. This initial three minute trial or practice period may be followed by a five minute testing period, during which the performance of the individual on the device is graphically recorded on the kymograph 24 to provide a record of the total amount of deviation of the main structure 2 from its normal upright position during each thirty seconds of the test. The record made on the kymograph of the deviation values may be readily utilized to plot the learning curve of the individual on a standard graph, which may then be compared and evaluated in relation to the learning curve of other individuals or previously established norms, all as more clearly set forth in my aforesaid co-pending application.

The values of the readings provided by the integrator 34 may also be utilized to evaluate the average performance of groups of individuals, to establish thus means and norms of performance.

The device of my present invention may also be utilized to compare the relative proficiency of the individual pilots of a group who are being considered for advanced or specialized flight training. For this purpose, a test procedure of from eight to fifteen minutes can be established and conducted with the stabilizing springs 16 and 17 adjusted with relatively light tension or, in some instances wherein the pilots undergoing test are highly skilled in the art of flying an aeroplane, with the springs 16 and 17 entirely disconnected from the main structure 2, to increase thereby to any desired degree the difficulty of the test to correspond to the relative flying skill of the group of pilots undergoing test. Similar tests may be readily conducted on the device of the present invention, on pilots whose flight records indicate that they are prone to accidents, thus to determine whether their flying aptitude, as exhibited by their performance in the operation of the device, is substandard.

The device of my present invention may also be utilized as a training device for developing certain spontaneous reflexes which are the same as, or similar to, those spontaneous reflexes which a student pilot must develop if he is to become a skillful pilot. The first phase of such a training or developing procedure may consist of short practice periods on the device, to develop the kinesthetic and visual pedal reflexes. In conducting such practice procedure, the stabilizing springs 16 and 17 may be initially adjusted to give a high degree of stability during the first period, and thereafter such springs may be adjusted with progressively decreasing tension during each period, until the student pilot has thoroughly developed his spontaneous reflexes as demonstrated by his ability to maintain effectively the main structure 2 in a state of equilibrium with the tension of the springs 16 and 17 reduced to a minimum or with such springs completely disconnected from main structure 2.

Referring now to the operation of that form of my present invention shown in Figs. 4 through 7, it will be understood that this device may be effectively utilized to test and develop the desirable rudder-aileron coordination that exemplifies a skilled and seasoned pilot. In the operation of this device, movement of the control stick 61 away from its normal central position, moves the treadmill frame 41 and its associated power driven endless belt 45 about the vertical spindle 49, thereby making it necessary for the individual undergoing test to apply appropriate pressure on the rudder pedals 5 or 5' to maintain the main structure 2 in a state of equilibrium. When the individual moves the control stick 61 to the left with respect to his position to the rear of said stick, his sense of balance will prompt him to apply pressure to the left rudder pedal 5, whereas movement of the control stick 61 to the right with respect to his position to the rear of said stick, will prompt him to apply pressure to the right rudder pedal 5'. These coordinated movements of the said control stick and rudder pedals simulate the coordinated movements of the control stick and rudders of an aeroplane during actual flight.

While undergoing practice procedure on the device of my present invention, the student-pilot must coordinate the control stick and rudder pedal movements or, otherwise, he will lose his balance, whereas in an aeroplane he may persist in poor and inefficient control coordination during many hours of instruction with no penalty imposed except mild slips or skids and the frayed nerves of his instructor. The act or acts of imposing rigid requirements in connection with proper and efficient coordination, during the early stages of the student's instruction period, as is done when utilizing the device of my present invention, will enable the student-pilot to develop a fine degree of muscular coordination within a relatively short period of time.

It will be obvious from the foregoing that by utilizing the mechanism shown in Fig. 8 as a substitute for the control stick 61 of Fig. 4, the student-pilot may be taught, and may readily develop, the necessary coordination between the rudder controls and aileron controls while employing control mechanisms of the type and construction customarily employed on modern, commercial transport and military aeroplanes.

The device of my present invention may also be utilized advantageously as a means for conducting basic research to determine those factors which inhibit or promote the development and conditioning of the spontaneous reflexes common to a particular motor skill, with particular emphasis on the study of the fine proprioceptive sensations and their associated minimal muscular movements. It is well known to those trained in the science of conducting tests, that the most important part of every series of scientific tests is the procurement of the basic data for the experimental and control groups, and that the devices and mechanisms heretofore available for conducting such tests and this type of research, operate solely on the measurement of time. The device of the present invention, instead of recording and/or indicating statistical values in time only, provides qualitative and quantitative values of performance against time, and thus eliminates the major cause of errors in the basic test data.

When conducting research of the general type above referred to, the usual practice of selecting experimental and control groups may be followed. For basic research in reflex development, my present invention may be effectively employed with the stabilizing springs 16 and 17 adjusted in accordance with the flying experience, or lack of flying experience, of the individuals undergoing the particular test program. The controlled conditions, such as length of each initial trial period, length of each actual test period, interval between actual test periods, speed of movement of the power driven endless belt which supports and drives wheel 3, mechanical advantage in the linkage between rudder pedals 5 and 5' and steering bar 6, visual cues, etc., may be introduced into the tests and materially varied, in accordance with the age, sex, experience, ability, etc., of the individuals undergoing test.

Research in the rate of development of various spontaneous responses and reflexes may readily be conducted by utilizing that form of my invention shown in Figs. 4 through 8 of the accompanying drawings, it being understood that when employing such device for this purpose, it is possible to introduce into the test any or all of the variables referred to in the preceding paragraph. For example, the device of Figs. 4 through 8 might well be used to determine the ability of a student-pilot to learn to operate the control stick 61 first with one hand and then with the other, such a test being capable of producing reliable and valuable statistical data regarding the manner in which the student-pilot learns to respond to a given stimulus through a different set or system of muscles.

The device of my present invention may also be used effectively as a means of research to determine the effect of alcohol, drugs, anoxia, fatigue, or like factors on the spontaneous responses and reflexes of an individual. When conducting such research, an individual is subjected to a test when not under the influence of, or affected by, such factors, and data is compiled indicative of his performance. The individual is then subjected to the same test after he is under the influence of, or affected by, such factors, and data is compiled indicative of his performance, the data first obtained and that last obtained being analyzed, evaluated, and compared, as a means for determining the effect of such factors on the individual undergoing test.

It is to be understood that the forms of my invention shown and described herein are to be taken as preferred embodiments of the same, and that various changes may be made in the size, shape, and arrangement and design of parts without departing from the spirit of my invention or the scope of the subjoined claims. While in the foregoing specification I have emphasized the utility of my present invention as a means for testing and training in the art of flying an aeroplane, it is to be understood that the device possesses utility in any art involving the testing and training connected with a motor skill involving controlled muscular movements.

Having thus described my invention, I claim:

1. A device for testing and training individuals in the development of motor skills comprising a main structure, a seat mounted on said structure, a base, a stationary support on said base, means for pivotally connecting the rear end of said structure to said stationary support for lateral tilting movements of said structure and for limited movement thereof about a vertical axis, a wheel for supporting the front end of said structure, means on said structure to enable an individual seated thereon to steer said wheel to maintain said structure in a state of equilibrium, a movable surface for supporting said wheel, and means independent of said structure for simultaneously driving said movable surface and the wheel supported thereon.

2. A device for testing and training individuals in the development of motor skills as defined in claim 1 and including resilient means for resisting lateral tilting movements of said main structure about its pivotal connection with said stationary support.

3. A device for testing and training individuals in the development of motor skills as defined in claim 1 and including resilient means for resisting lateral tilting movements of said main structure about its pivotal connection with said stationary support, and means for adjusting the effective strength of said resilient means.

4. A device for testing and training individuals in the development of motor skills as defined in claim 1 and including stationary members disposed at each side of said structure adjacent the rear end thereof, and tension springs connected to each side of said main structure at the rear end thereof and extending between said structure and said adjacent stationary members, for resisting the lateral tilting movements of said main structure about its pivotal connection with said stationary support.

5. A device for testing and training individuals in the development of motor skills as defined in claim 1 wherein the steering means for said wheel comprises a pair of manually operable pedals.

6. A device for testing and training individuals in the development of motor skills as defined in claim 1 wherein the independently-driven movable surface for supporting said wheel comprises a power driven treadmill of the endless belt type.

7. A device for testing and training individuals in the development of motor skills as defined in claim 1 including mechanism connected to the main structure and operated by lateral tilting movements thereof for recording said lateral tilting movements of said main structure.

8. A device for testing and training individuals in the development of motor skills as defined in claim 1 including a kymograph, and means operatively connecting said main structure and said kymograph and operated by lateral tilting movements of said main structure, whereby said lateral tilting movements of said main structure are graphically recorded by said kymograph.

9. A device for testing and training individuals in the development of motor skills as defined in claim 1, including a kymograph and operated by lateral tilting movements of said main structure, a rod connected to the pen of said kymograph to actuate said pen in accordance with said lateral tilting movements, a flexible cable connected between said rod and said main structure, and a spring connected to said rod to continuously impose a spring loading on said rod and cable, lateral tilting movements of said main structure in one direction being transmitted to the pen of said kymograph by said cable and rod, and lateral tilting movements of said main structure in the opposite direction being transmitted to the pen of said kymograph by said cable, rod, and spring.

10. A device for testing and training individuals in the development of motor skills as defined in claim 1, including an electric integrator, and means for operatively connecting said integrator to said main structure for actuation thereby in accordance with the lateral tilting movements of said structure, whereby said lateral tilting movements are totalized by said integrator.

11. A device for testing and training individuals in the development of motor skills comprising a main structure, a seat mounted on said structure, a base, a stationary support on said base, means for pivotally connecting the rear end of said structure to said stationary support for lateral tilting movements of said structure and for limited movement thereof about a vertical axis, a wheel for supporting the front end of said structure, means on said structure to enable an individual seated thereon to steer said wheel to maintain said structure in a state of equilibrium, a movable surface for supporting said wheel, means for mounting said movable surface for rotation about a vertical pivot, manually operable means for turning said movable surface about said vertical pivot, and means independent of said structure for simultaneously driving the movable surface and said wheel supported thereon.

12. A device for testing and training individuals in the development of motor skills as defined in claim 11, wherein the manually operable means for turning said movable surface about said vertical pivot comprises a manually operable pivotally mounted control stick, and means connecting said stick to said movable surface whereby movement of said stick effects movement of said surface about its vertical pivot.

13. A device for testing and training individuals in the development of motor skills as defined in claim 11, wherein the manually operable means for turning said movable surface about said vertical pivot comprises a manually operable control wheel, and means transmitting rotation of said control wheel to said movable surface whereby movement of said control wheel effects movement of said surface about its vertical pivot.

BERT A. SHIELDS.

REFERENCES CITED

The following references are of record in the file of this patent:

UNITED STATES PATENTS

| Number | Name | Date |
|---|---|---|
| 1,925,180 | Eyerly | Sept. 5, 1933 |
| 2,062,678 | Rockwell | Dec. 1, 1936 |
| 2,514,606 | Jenny | July 11, 1950 |

FOREIGN PATENTS

| Number | Country | Date |
|---|---|---|
| 99,657 | Germany | Jan. 9, 1898 |